C. F. JENKINS.
TIRE REPAIR DEVICE.
APPLICATION FILED SEPT. 18, 1911.
1,024,078.
Patented Apr. 23, 1912.
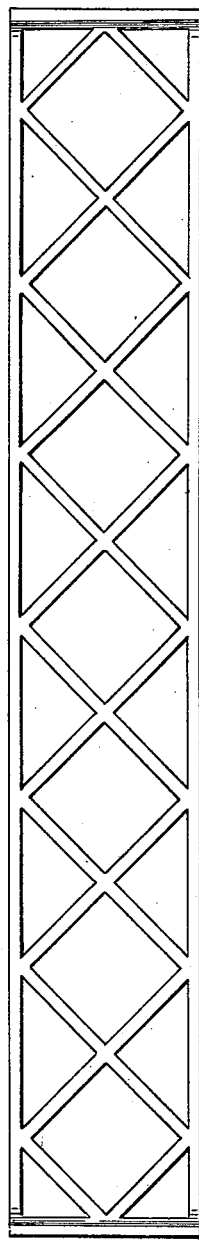
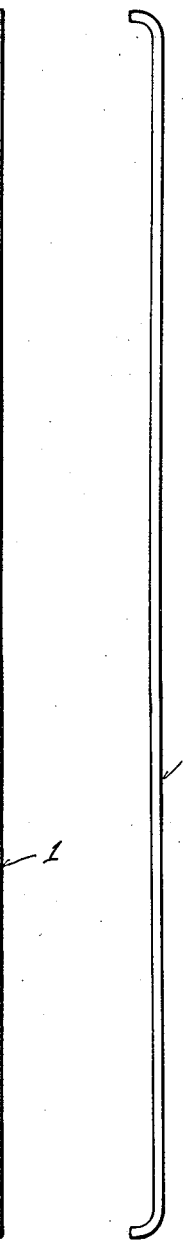
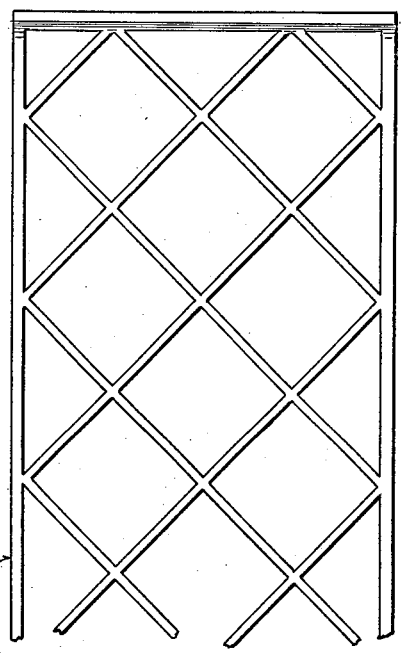
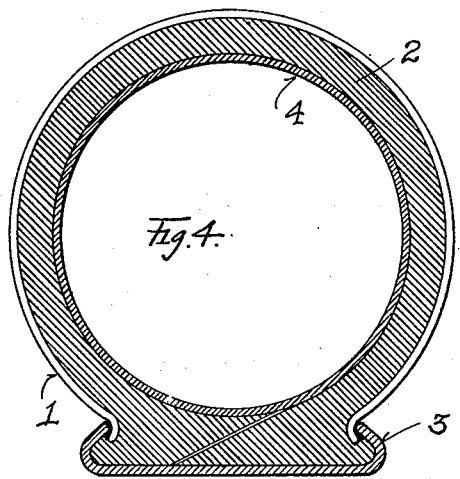

UNITED STATES PATENT OFFICE.

CHARLES FRANCIS JENKINS, OF WASHINGTON, DISTRICT OF COLUMBIA.

TIRE-REPAIR DEVICE.

1,024,078.  Specification of Letters Patent.  Patented Apr. 23, 1912.

Application filed September 18, 1911. Serial No. 649,878.

*To all whom it may concern:*

Be it known that I, CHARLES FRANCIS JENKINS, citizen of the United States, residing at Washington, District of Columbia, have invented certain new and useful Improvements in Tire-Repair Devices, of which the following is a specification.

This invention relates to that class of apparatus known as tire repair devices, and its principal object is to provide a device which will quickly and effectively repair a blow-out or other serious rupture of the shoe or casing of an automobile pneumatic tire.

The device, and its method of use, are shown in the accompanying drawings, in which—

Figure 1 is a plan view of the device; Fig. 2 a side or edge view thereof; Fig. 3 a larger, or wider, form of the device; and Fig. 4 the method of applying it to an automobile tire.

In the figures, 1 is the device; 2 the tire to which it is applied; 3 the rim into opposite edges of which its ends hook; and 4 the inner tube of the tire.

The article, as shown in the illustrations, consists of a single strip of perforated metal, preferably, with slender-section parts, and slightly bent-up ends.

To apply the device to a ruptured tire, one bent-up end is forced under the lip of the wheel rim so as to lie between the rim-edge and the tire, and the other end bent over the tire and hooked under the opposite lip or edge of the rim. The tire is then inflated, and, as the device is of such a length that it fits the tire snugly before it is inflated, inflation swells the tire until the slender sections of the device are, usually, wholly buried, or, at least, partly buried, in the rubber of the tire and hold it against lateral or longitudinal displacement, effecting a durable repair which will last longer than any other part of the tire.

It has been found that with this device the ends of a tire which has been completely severed will be held firmly together and prove as useful as a new tire. It is obvious that more than one of these repair devices might be applied to the tire if needed, and that the article could be made in a variety of widths.

I do not wish to limit myself to the stamped metal, lattice-like pattern, of a single piece of metal, or to stamped metal, as it is obvious that the device might be formed in a different manner, with round holes, for example, or of wire electrically welded, or of cord, the essential requirement being that it should be of such a pattern that it will have the required longitudinal and lateral strength with tire-gripping properties.

What I claim, is—

A single piece metal structure of lattice-like form having hooked ends adapted to engage opposite edges of pneumatic-tire rims, to confine a section of the tire thereunder.

In testimony whereof I have affixed my signature in presence of two witnesses.

CHARLES FRANCIS JENKINS.

Witnesses:
  JAMES L. CRAWFORD,
  WM. H. HUTCHERSON.

---

Copies of this patent may be obtained for five cents each, by addressing the "Commissioner of Patents, Washington, D. C."